(12) United States Patent
Soleño et al.

(10) Patent No.: US 10,700,518 B2
(45) Date of Patent: Jun. 30, 2020

(54) CONSTANT CURRENT LIMITING PROTECTION FOR SERIES COUPLED POWER SUPPLIES

(71) Applicant: Astec International Limited, Kowloon (HK)

(72) Inventors: Antonio Remetio Soleño, Mandaluyong (PH); Ronnie Bachiller Gozun, Quezon (PH); Eric Ortaliz Henares, Muntinlupa (PH); Vincent Vicente Vivar, Muntinlupa (PH)

(73) Assignee: Astec International Limited, Kwun Tong, Kowloon (HK)

( * ) Notice: Subject to any disclaimer, the term of this patent is extended or adjusted under 35 U.S.C. 154(b) by 926 days.

(21) Appl. No.: 14/878,331

(22) Filed: Oct. 8, 2015

(65) Prior Publication Data
US 2017/0104340 A1 Apr. 13, 2017

(51) Int. Cl.
*H02J 5/00* (2016.01)
*H02J 1/06* (2006.01)
*H02J 3/10* (2006.01)

(52) U.S. Cl.
CPC .. *H02J 1/06* (2013.01); *H02J 3/10* (2013.01)

(58) Field of Classification Search
CPC ..... H02J 1/06; H02J 3/10; H02J 5/005; Y02P 80/14; G05F 1/38; G05F 1/62; H02M 1/44; H02M 3/1584

(Continued)

(56) References Cited

U.S. PATENT DOCUMENTS

| 5,023,541 A * | 6/1991 | Yosinski | G05F 1/563 323/275 |
| 5,449,959 A * | 9/1995 | Yang | G05F 1/62 307/63 |

(Continued)

FOREIGN PATENT DOCUMENTS

| CN | 102263496 A | 11/2011 |
| CN | 104052249 A | 9/2014 |

(Continued)

OTHER PUBLICATIONS

Constant Voltage and Constant Current Controller for Battery Chargers and Adapters, Nov. 2003; pp. 1-9.

(Continued)

*Primary Examiner* — Thienvu V Tran
*Assistant Examiner* — Brian K Baxter
(74) *Attorney, Agent, or Firm* — Harness, Dickey & Pierce, P.L.C.

(57) ABSTRACT

A control circuit for controlling multiple power supplies having their outputs coupled in series is configured to in response to an output current reaching a defined current threshold of a power supply of the power supplies, control the power supply to operate in its constant current mode so that the output current is regulated at the defined current threshold as the remaining power supplies operate in their constant voltage mode, and in response to the output voltage of the power supply reaching a defined voltage threshold, control the power supply to operate in its constant voltage mode so that the power supply provides a first regulated output voltage to its output as the remaining power supplies provide a second regulated output voltage different than the first regulated output voltage to their output. Various other systems, power supplies, control circuit and methods are also disclosed.

27 Claims, 8 Drawing Sheets

(58) Field of Classification Search
USPC .......................................................... 307/61
See application file for complete search history.

(56) References Cited

U.S. PATENT DOCUMENTS

| | | | | |
|---|---|---|---|---|
| 6,628,106 | B1* | 9/2003 | Batarseh | H02M 3/1584 323/222 |
| 2003/0173937 | A1* | 9/2003 | Uematsu | H02M 3/1584 323/205 |
| 2006/0087871 | A1* | 4/2006 | Vulovic | H02M 3/137 363/73 |
| 2009/0016086 | A1* | 1/2009 | Huynh | H02M 3/33523 363/80 |
| 2009/0115383 | A1* | 5/2009 | Benes | G05F 1/46 323/280 |
| 2009/0128112 | A1* | 5/2009 | Xu | H02M 1/32 323/282 |
| 2012/0274290 | A1* | 11/2012 | Ye | H02M 3/156 323/234 |
| 2013/0021009 | A1* | 1/2013 | Waltman | H02M 3/156 323/271 |
| 2013/0223108 | A1* | 8/2013 | Xu | H02M 3/335 363/21.17 |
| 2014/0210402 | A1* | 7/2014 | Sakita | H02M 3/1584 320/107 |
| 2014/0266131 | A1* | 9/2014 | Deboy | H02M 3/158 323/311 |
| 2015/0349647 | A1* | 12/2015 | Zane | H02M 3/33507 363/17 |
| 2016/0357202 | A1* | 12/2016 | Ma | G05F 1/46 |

FOREIGN PATENT DOCUMENTS

| | | |
|---|---|---|
| CN | 104600978 A | 5/2015 |
| KR | 101400798 B1 | 5/2014 |

OTHER PUBLICATIONS

Pan et al., A Low-Complexity Dual-Voltage-Loop Digital Control Architecture With Dynamically Varying Voltage and Current References; Apr. 2014; pp. 2049-2260.

Bryant et al.; Voltage Loop of Boost PWM DC-DC Converters With Peak Current-Mode Control; Jan. 2006; pp. 99-105.

* cited by examiner

CONSTANT CURRENT LIMITING PROTECTION FOR SERIES COUPLED POWER SUPPLIES

FIELD

The present disclosure relates to constant current limiting protection for series coupled power supplies.

BACKGROUND

This section provides background information related to the present disclosure which is not necessarily prior art.

Figure 1A:
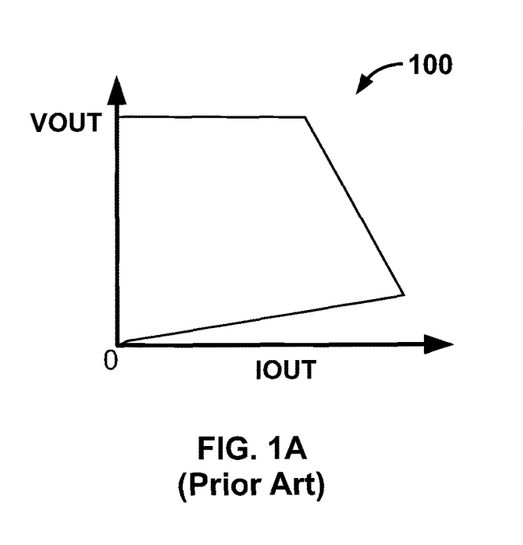
FIGS. 1A-C are V-I characteristics curves of a power supply system including two power supplies controlled by conventional methods.

Power supplies having outputs coupled in series each commonly include an overcurrent protection (OCP) scheme. Some typical OCP schemes include a latching overcurrent protection scheme and a foldback current limiting scheme. For example, FIG. 1A illustrates a voltage-current (V-I) characteristics curve 100 of two series coupled power supplies each employing a latching OCP scheme in which an output current increases until it reaches an OCP threshold (e.g., 130% of a rated output current). At that time, the output current and voltage terminate to zero.

Figure 1B:
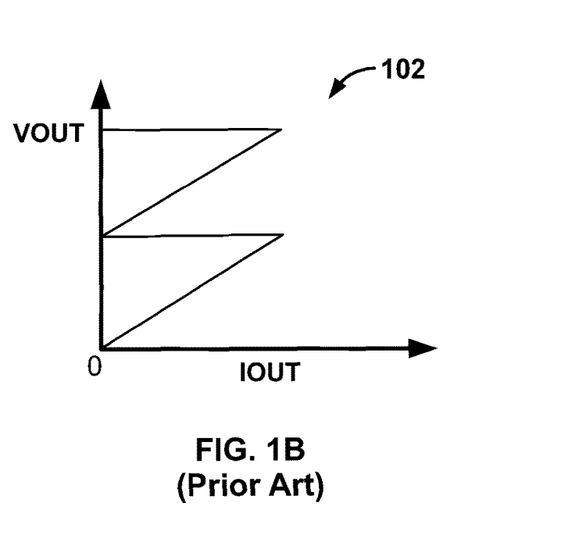

FIG. 1B illustrates a V-I characteristics curve 102 of two series coupled power supplies each employing a foldback current limiting scheme. In this case, one of the power supplies enters its foldback mode when an output current reaches its OCP threshold thereby causing the output current and an output voltage to decrease linearly. The output current then increases again until the other power supply enters its foldback mode causing the output current and the output voltage to decrease linearly again.

Figure 1C:
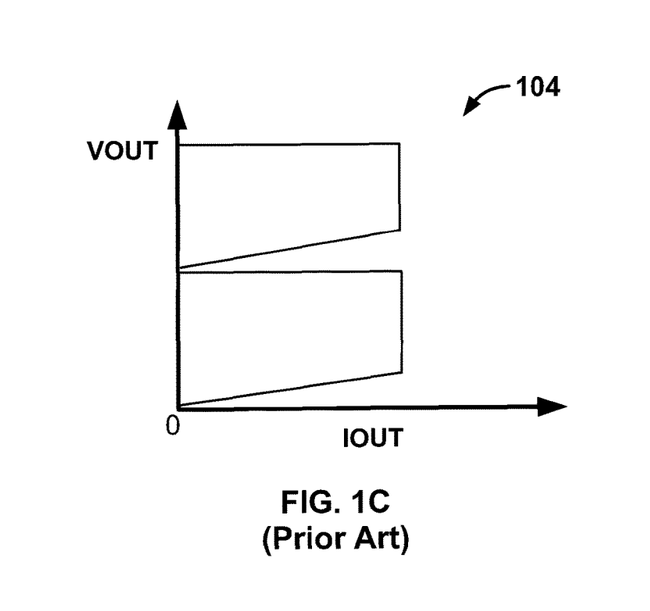

FIG. 1C illustrates a V-I characteristics curve 104 of two series coupled power supplies each employing a constant current limiting scheme and a foldback current limiting scheme in which an output current is held steady at a particular level until an output voltage reaches a defined threshold. At which time, the power supplies enter their foldback mode as explained above.

SUMMARY

This section provides a general summary of the disclosure, and is not a comprehensive disclosure of its full scope or all of its features.

According to one aspect of the present disclosure, a power supply system for providing power to a load includes a plurality of power supplies configured to provide an output current to a load, and a control circuit coupled to each power supply. Each power supply is configured to operate in a constant current mode and a constant voltage mode and includes a defined current threshold, a defined voltage threshold, and an output for providing an output voltage to the load. The outputs of the plurality of power supplies are coupled in series. The control circuit is configured to in response to the output current of the plurality of power supplies reaching a defined current threshold of one power supply of the plurality of power supplies, control said one power supply to operate in its constant current mode so that the output current is regulated at the defined current threshold of said one power supply. The control circuit is further configured to in response to the output voltage of said one power supply reaching its defined voltage threshold, control said one power supply to operate in its constant voltage mode so that said one power supply provides a first regulated output voltage to its output as the remaining one or more power supplies of the plurality of power supplies provide a second regulated output voltage different than the first regulated output voltage to their output.

According to another aspect of the present disclosure, a control circuit for controlling a plurality of power supplies configured to provide an output current to a load is disclosed. Each power supply of the plurality of power supplies is configured to operate in a constant current mode and a constant voltage mode and includes a defined current threshold, a defined voltage threshold, and an output for providing an output voltage to the load. The outputs of the plurality of power supplies are coupled in series. The control circuit is configured to couple to said each power supply of the plurality of power supplies, and in response to the output current of the plurality of power supplies reaching a defined current threshold of one power supply of the plurality of power supplies, control said one power supply to operate in its constant current mode so that the output current is regulated at the defined current threshold of said one power supply. The control circuit is further configured to in response to the output voltage of said one power supply reaching its defined voltage threshold, control said one power supply to operate in its constant voltage mode so that said one power supply provides a first regulated output voltage to its output as the remaining one or more power supplies of the plurality of power supplies provide a second regulated output voltage different than the first regulated output voltage to their output.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
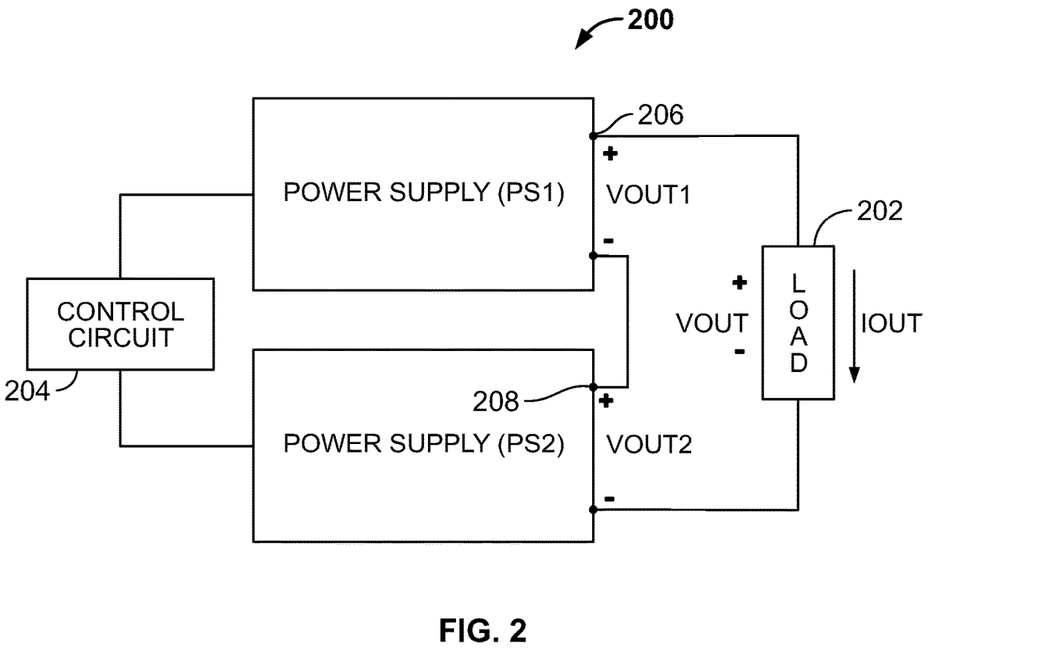
FIG. 2 is a block diagram of a power supply system including two power supplies and a control circuit according to one example embodiment of the present disclosure.

A power supply system for providing power to a load according to one example embodiment of the present disclosure is illustrated in FIG. 2 and indicated generally by reference number 200. As shown in FIG. 2, the power supply system 200 includes two power supplies PS1, PS2 configured to provide an output current Iout to a load 202 and a control circuit 204 coupled to each power supply PS1, PS2. Each power supply PS1, PS2 is configured to operate in a constant current mode and a constant voltage mode and include a defined current threshold, a defined voltage threshold, and an output 206, 208, respectively, for providing an output voltage Vout1, Vout2 to the load 202. As shown in FIG. 2, the output 206 of the power supply PS1 is coupled in series with the output 208 of the power supply PS2.

The control circuit 204 controls one of the power supplies (e.g., the power supply PS1) to operate in its constant current mode so that the output current Iout is regulated at the defined current threshold of the power supply PS1 in response to the output current Iout of the power supplies PS1, PS2 reaching the defined current threshold of the power supply PS1. In response to the output voltage Vout1 of the power supply PS1 reaching its defined voltage threshold, the control circuit 204 controls the power supply PS1 to operate in its constant voltage mode so that the power supply PS1 provides a regulated output voltage to its output 206 as the power supply PS2 provides a different regulated output voltage to its output 208.

After which, and as further explained below, the other power supply PS2 may be controlled to operate in the same manner (e.g., in its constant current mode and then in its constant voltage mode) as the power supply PS1 explained above.

As mentioned above, the outputs 206, 208 are coupled in series. As such, the output current Iout flows through each power supply PS1, PS2 and the load 202. In particular, the output current Iout (e.g., the load current) exits the power supply PS1 through a positive terminal of the output 206 and flows through the load 202 to a negative terminal of the output 208. The output current Iout then exits the power supply PS2 through a positive terminal of the output 208 and then enters the power supply PS1 through a negative terminal of the output 206. Additionally, an output voltage Vout across the load 202 is equal to the sum of the output voltages Vout1, Vout2 of the power supplies PS1, PS2, respectively.

Figure 3:
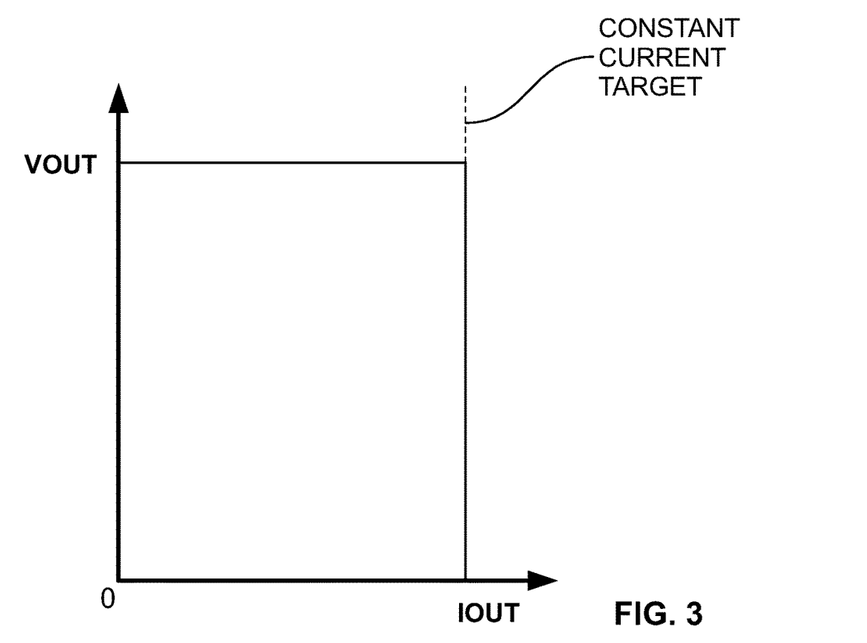
FIG. 3 is a V-I characteristics curve of the power supply system of FIG. 2.

By controlling power supplies (e.g. the power supplies PS1, PS2 of FIG. 2) having their outputs coupled in series as explained herein, the power supplies are able to maintain a steady output current near (and sometimes at) a constant current target value at a lower output voltage than prior art systems. For example, FIG. 3 illustrates a V-I characteristics curve 300 of the output current and voltage provided by the power supply system 200. As shown in FIG. 3, the output current Iout remains at the constant current target value thereby achieving constant current limiting protection of the power supplies to an output voltage of zero.

For example, and as further explained below, when one or both power supplies PS1, PS2 are operating in their constant voltage mode, an output voltage is regulated at a set nominal value based on a voltage reference of each power supply PS1, PS2. When the output current Iout reaches the defined current threshold of one of the power supplies PS1, PS2, the voltage reference of that power supply can be modified (as further explained below) to limit the output current to the defined current threshold of that power supply until its output voltage reaches a defined voltage threshold (e.g., a minimum rated operating voltage).

Figure 4:
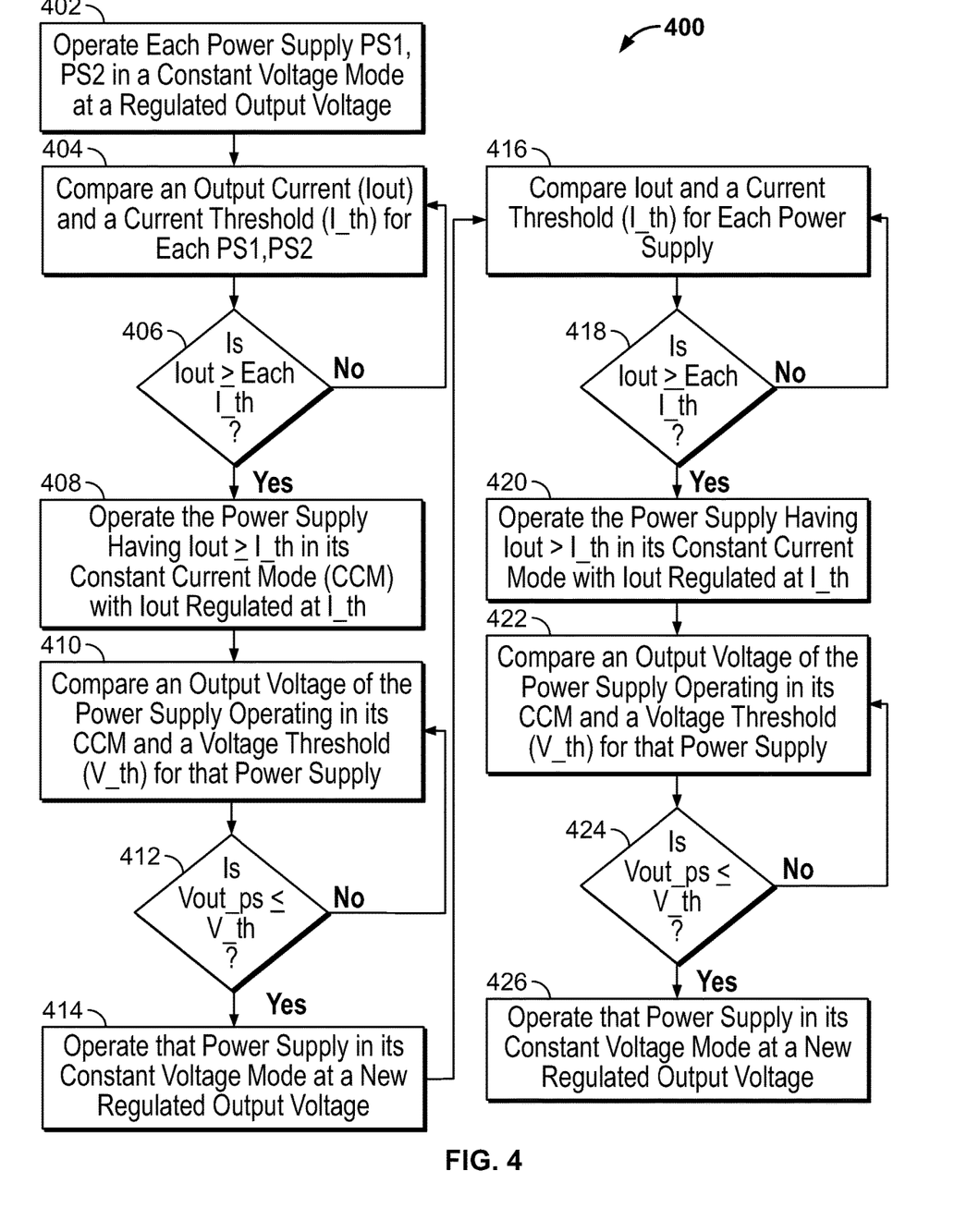
FIG. 4 is a flow chart of a control method implemented by the control circuit of FIG. 2.
Figure 5:
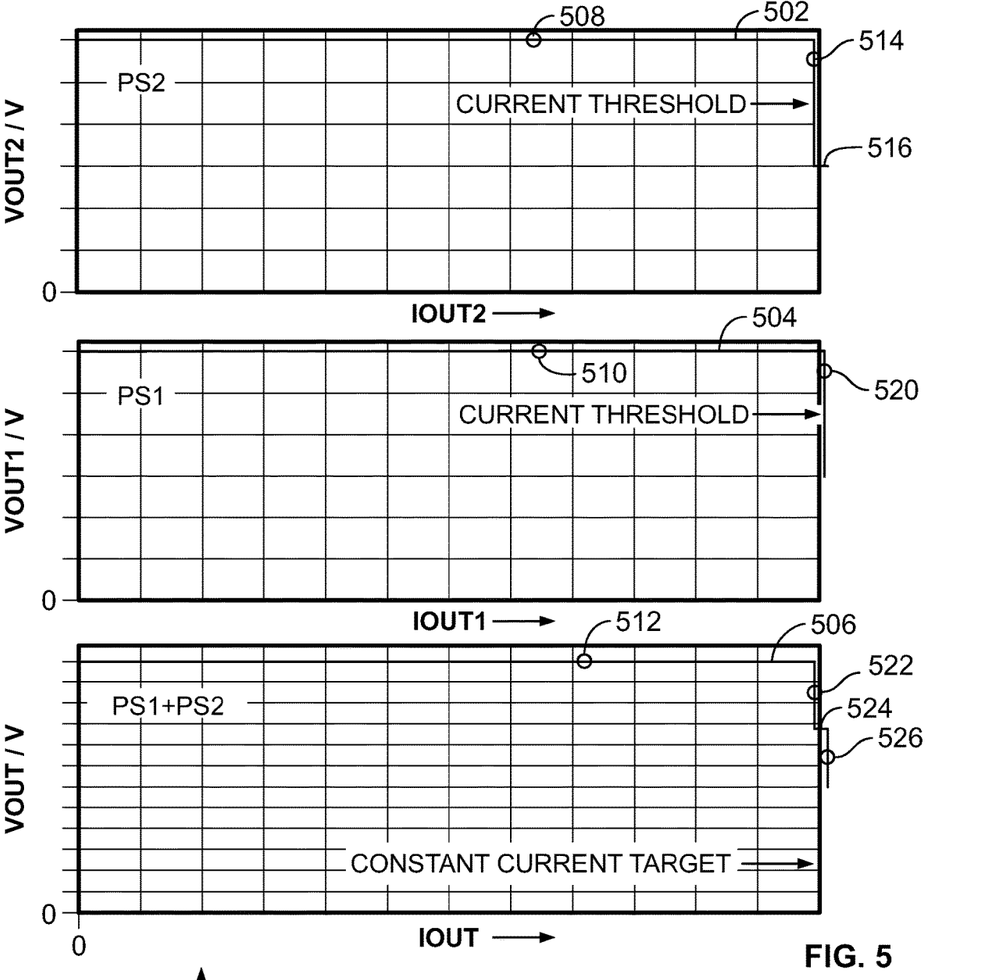
FIG. 5 are V-I characteristics curves of individual power supplies of a power supply system and of the power supply system controlled by the control method of FIG. 4.
Figure 6:
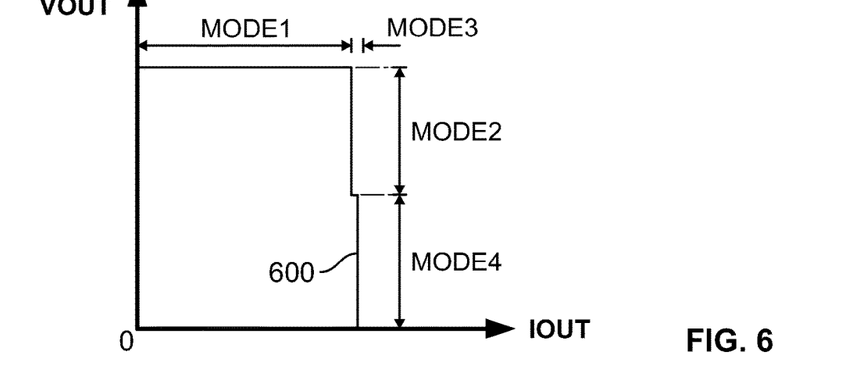
FIG. 6 is another V-I characteristics curve of the power supply system controlled by the control method of FIG. 4.

FIG. 4 illustrates an example flow chart 400 of a control process implemented in a control circuit for controlling multiple power supplies of a power supply system in which the outputs of the power supplies are coupled in series. FIG. 5 illustrates example V-I characteristics curves 502, 504, 506 of the output of each power supply of the multiple power supplies and of the output of the power supply system (i.e., the combined outputs of each power supply). FIG. 6 illustrates another example V-I characteristics curve 600 of the power supply system showing different operating modes.

Although the control process and the V-I characteristics curves of FIGS. 4-6 are described with respect to the power supply system 200 of FIG. 2, it should be apparent that the control process and/or the V-I characteristics curves may be used to control and/or represent another example power supply system having n power supplies PS1, PS2 ... PSn (where n equals the number of power supplies in a system).

As shown in FIG. 4, each power supply PS1, PS2 may be initially controlled to operate in its constant voltage mode and provide a regulated output voltage to the load 202 in block 402. This is shown as Mode 1 of FIG. 6 and line segments 508, 510, 512 of FIG. 5. During this initial control process, the output current Iout begins to increase over time. To ensure the output current Iout does not increase to a potentially damaging level and/or is maintained near a constant current target value (shown in the curve 506 of FIG. 5), the output current Iout of the power supplies PS1, PS2 is compared to a defined current threshold I_th of each power supply (block 404 of FIG. 4).

If the output current Iout is less than the defined current threshold I_th for each power supply PS1, PS2, the process returns to compare these values again (block 406). However, in response to the output current Iout reaching (e.g., greater than or equal to) a defined current threshold I_th of one of the power supplies PS1, PS2 (i.e., the power supply having the lowest defined current threshold), that power supply is controlled to operate in its constant current mode and the output current Iout is regulated at the lowest defined current threshold I_th in block 408.

In this example, assume the power supply PS2 has the lowest defined current threshold. Thus, the power supply PS2 is controlled to operate in its constant current mode and the output current Iout is regulated at the defined current threshold I_th_ps2 of the power supply PS2. This is represented by Mode 2 of FIG. 6 and line segments 514, 522 of FIG. 5. At this point, the power supply PS1 remains in its constant voltage mode providing the regulated output voltage to the load 202, as shown in the curve 504 of FIG. 5.

During this time, the output voltage Vout2 of the power supply PS2 decreases, as shown by the line segment line 514 of FIG. 5. To ensure the output voltage Vout2 does not decrease to a level detrimental to the power supply PS2 and/or the system 200, the output voltage Vout2 is compared to a defined voltage threshold V_th_ps2 of the power supply PS2 in block 410 of FIG. 4. If the output voltage Vout2 is greater than the defined voltage threshold V_th_ps2, the process returns to compare these values again (block 412).

However, in response to the output voltage Vout2 reaching (e.g., less than or equal to) the defined voltage threshold V_th_ps2, the power supply PS2 is controlled to operate (again) in its constant voltage mode in block 414 and to provide a new regulated output voltage to the load 202. This is shown as Mode 3 of FIG. 6 and line segments 516, 524 of FIG. 5. Since the output voltage Vout2 reduces during the constant current mode, the regulated output voltage of the power supply PS1 is greater than the new regulated output voltage of the power supply PS2.

Because both power supplies PS1, PS2 are again regulating its output voltage Vout1, Vout2 (albeit at different voltages), the output current Iout begins to increase again. As such, the output current Iout is again compared to the defined current threshold I_th of each power supply in blocks 416, 418 (e.g., similar to blocks 404, 406). In response to the output current Iout reaching the defined current threshold I_th_ps1 of the power supply PS1, the power supply PS1 is controlled to operate in its constant current mode and to regulate the output current Iout at the defined current threshold I_th_ps1 in block 420. This is represented by Mode 4 of FIG. 6 and line segments 520, 526 of FIG. 5.

During this time, the output voltage Vout1 of the power supply PS1 decreases. Thus (and like the power supply PS2), the output voltage Vout1 of the power supply PS1 is compared to a defined voltage threshold V_th_ps1 of the power supply PS1 in block 422, 424 (e.g., similar to blocks 410, 412). In response to the output voltage Vout1 reaching the defined voltage threshold V_th_ps1, the power supply PS1 is controlled to operate (again) in its constant voltage mode in block 426 and to provide a new regulated output voltage to the load 202.

At some point, one or both power supplies PS1, PS2 may transition from their constant voltage mode back to their constant current mode to maintain the output current Iout near (and sometimes at) the constant current target value as explained above. In some embodiments, this transition may not take place until each of the power supplies has reentered its constant voltage mode. This transition may be based on, for example, one or more components of the control circuit 204 as further explained below.

The defined voltage thresholds V_th of FIG. 4 may be any suitable value including, for example, about half the initial regulated output voltage, more or less than about half the initial regulated output voltage, etc. The defined voltage thresholds V_th may depend on, for example, power supply specifications (e.g., the minimum rated voltage of the power supply), user requirements, etc. For example, the defined voltage thresholds V_th_ps1 of the power supply PS1 may be equal to the minimum rated operating voltage of that power supply. As such, the power supply PS1 may provide a new regulated output voltage equal to its minimum rated operating voltage when the power supply PS1 reenters its constant voltage mode as explained above. Additionally, the defined voltage threshold V_th of the power supplies PS1, PS2 may be the same or different for each power supply so long as the new regulated output voltage provided by the power supply PS1 is substantially equal to the new regulated output voltage provided by the power supply PS2.

Further, although the defined current thresholds I_th of the power supplies PS1, PS2 are described as different above, it should be understood that the defined current thresholds I_th of the power supplies PS1, PS2 may be the same for each power supply. In such cases, the control circuit 204 can ensure one of the power supplies PS1, PS2 transitions between modes at a time.

Figure 7:
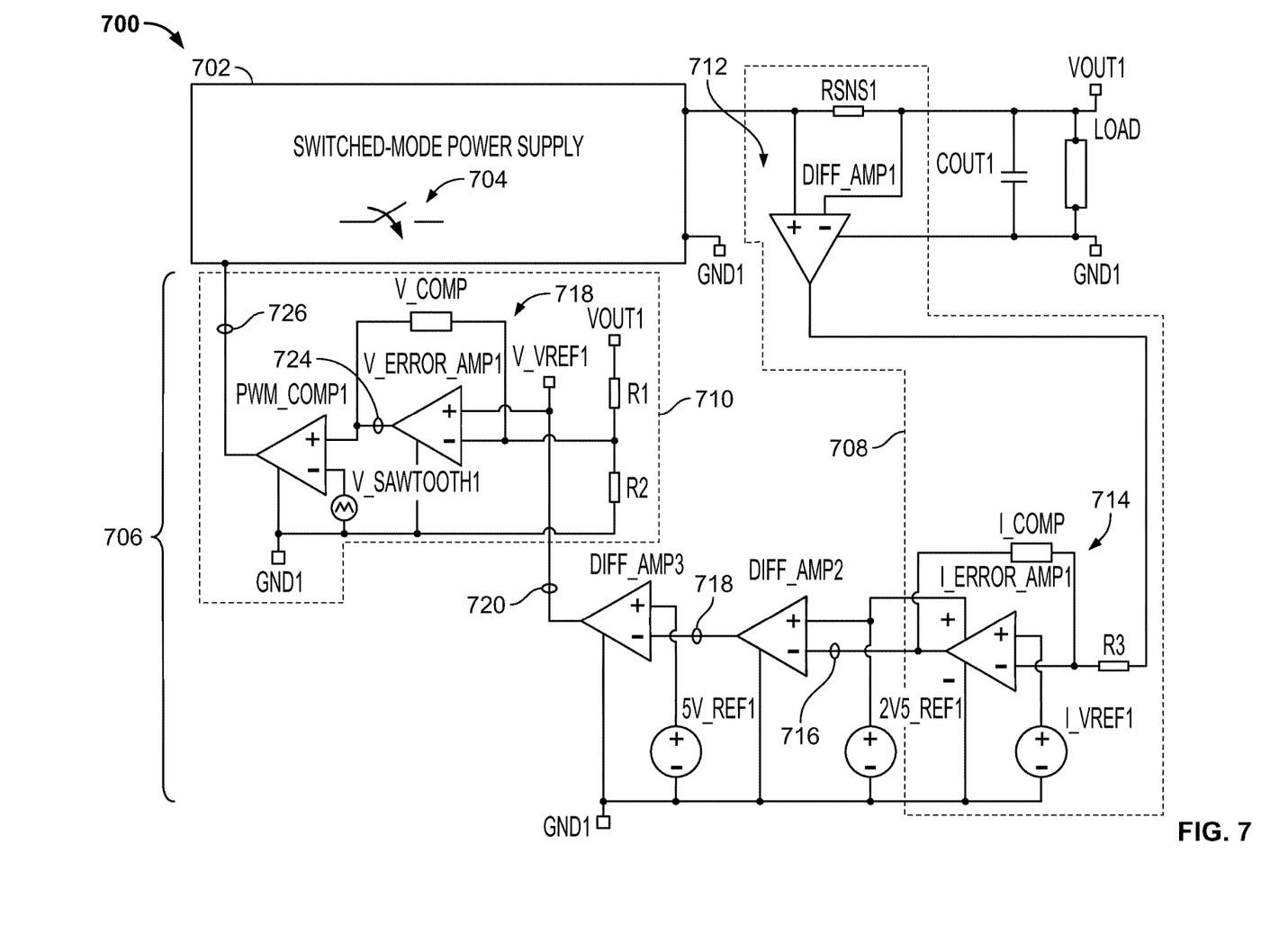
FIG. 7 is a schematic of a power supply unit including a switched-mode power supply and a control circuit having a current control loop and a voltage control loop with an adjustable voltage reference according to another example embodiment.

FIG. 7 illustrates one example power supply and control circuit (collectively a power supply unit 700) that may be employed in one or both power supplies PS1, PS2 of FIG. 2. As shown in FIG. 7, the power supply unit 700 includes a switched mode power supply 702 having at least one power switch 704, and a control circuit 706 for controlling the at least one power switch 704. Although FIG. 7 illustrates a switched mode power supply, it should be apparent that any suitable power supply may be employed.

As shown in FIG. 7, the control circuit 706 includes a current control loop 708 and a voltage control loop 710 for controlling the power supply 702. The current control loop 708 includes a current sensing device 712 for sensing an output current, a current reference I_VREF1, a current-loop error amplifier I_ERROR_AMP1, and a compensation network 714.

The current sensing device 712 of FIG. 7 includes a resistor RSNS1 and a differential amplifier DIFF_AMP1. The output current flowing through the resistor RSNS1 creates a voltage drop across the resistor. The voltage across the resistor RSNS1 is amplified by the differential amplifier DIFF_AMP1. The output of the differential amplifier DIFF_AMP1 is used as the output current feedback provided to an inverting pin (INV) of the current-loop error amplifier I_ERROR_AMP1. Although the current sensing device 712 includes a resistor for sensing current, it should be apparent that other suitable devices such as a current transformer, a hall-effect sensor, etc. may be used instead.

As shown in FIG. 7, the current reference I_VREF1 is provided to a non-inverting pin (NINV) of the current-loop error amplifier I_ERROR_AMP1. In the example of FIG. 7, the current reference I_VREF1 is used to set a defined current threshold (as explained above) of the power supply 702.

The compensation network 714 includes a resistor R3 and compensation component(s) I_COMP. The compensation network 714 may dictate how fast the current control loop 708 reacts to transient conditions and control a signal 726 (e.g., a PWM signal) provided to the at least one power switch 704, depending on an error signal 716 from the current-loop error amplifier I_ERROR_AMP1 that is processed by the compensation component(s) I_COMP.

The error signal 716 is provided to an inverting pin (INV) of a differential amplifier DIFF_AMP2 and a 2.5V reference voltage 2V5_REF1 is provided to a non-inverting pin (NINV) of the differential amplifier DIFF_AMP2. The differential amplifier DIFF_AMP2 compares the values and outputs an error signal 718 to an inverting pin (INV) of a differential amplifier DIFF_AMP3 that compares the error signal 718 and a 5V reference voltage 5V_REF1 (received at its non-inverting pin). The differential amplifier DIFF_AMP3 outputs an error signal 720 to the voltage control loop 710.

In the example embodiment of FIG. 7, the voltage control loop 710 includes resistors R1, R2, a voltage reference V_VREF1 for regulating an output voltage of the power supply 702, a voltage-loop error amplifier V_ERROR_AMP1, a compensation network 718, and a control signal generator PWM_COMP1.

As shown in FIG. 7, the output voltage Vout1 of the power supply 702 is sensed through the resistors R1, R2 acting as a resistor divider network and is provided to an inverting pin (INV) of the voltage-loop error amplifier V_ERROR_AMP1. The voltage reference V_VREF1 is provided to a non-inverting pin (NINV) of the voltage-loop error amplifier V_ERROR_AMP1.

The compensation network 718 includes the resistor R1 and compensation component(s) V_COMP. Similar to the compensation network 714, the compensation network 718 can dictate how fast the voltage control loop 710 reacts to transient conditions and control the signal 726 provided to the power switch 704 depending on an error signal 724 from the voltage-loop error amplifier V_ERROR_AMP1.

The control signal generator PWM_COMP1 generates the control signal 726 for controlling the power switch 704 based on various signals. For example, and as shown in FIG. 7, the error signal 724 from the voltage-loop error amplifier V_ERROR_AMP1 is provided to a non-inverting pin (NINV) of the control signal generator PWM_COMP1 and a sawtooth signal V_SAWTOOTH1 is provided to an inverting pin (INV) of the control signal generator PWM_COMP1. Based on a comparison of these signals, the control signal generator PWM_COMP1 generates the control signal 526 for controlling the power switch 704.

In some embodiments, the sawtooth signal V_SAWTOOTH1 may represent different features depending on the operating mode of the power supply 702. For example, the sawtooth signal V_SAWTOOTH1 may represent a ramp signal when the power supply 702 is operated in its constant voltage mode. In such cases, the sawtooth signal V_SAWTOOTH1 may be an artificial ramp signal for the control signal 726. In other embodiments, the sawtooth signal V_SAWTOOTH1 may represent a switching current (e.g., a maximum rated current) of the power supply 702 when the power supply 702 is operated in its constant current mode.

The voltage reference V_VREF1 may be fixed at a defined voltage at times and adjustable based on an output of the current control loop 708 at other times. For example, if the output current is less than the current reference I_VREF1 (e.g., when the power supply 702 is operating in its constant voltage mode as explained above), the error signal 716 from the current-loop error amplifier I_ERROR_AMP1 is at a cut-off region. In this example, that means the error signal 716 is 2.5V because the current-loop error amplifier I_ERROR_AMP1 is biased by a 2.5V reference voltage 2V5_REF1. Because the error signal 716 provided to the differential amplifier DIFF_AMP2 is equal to the 2.5V reference voltage 2V5_REF1, the error signal 718 from the differential amplifier DIFF_AMP2 is zero volts. The error signal 720 from the differential amplifier DIFF_AMP3 is 5V based on the comparison between the error signal 718 (e.g., 0V) and the 5V reference voltage 5V_REF1. This error signal 720 then sets the voltage reference V_VREF1. Thus, when the power supply 702 is operating in its constant voltage mode, the voltage reference V_VREF1 is fixed to 5V (in this example) and the output voltage Vout1 of the power supply 702 is regulated at a particular voltage based on the 5V voltage reference. In such examples, the output of the voltage control loop 710 directly controls a duty cycle of the control signal 726 to regulate the output voltage Vout1 as explained above.

When the output current is equal to or greater than the current reference I_VREF1 (e.g., when the power supply 702 is operating in its constant current mode as explained above), the voltage reference is dynamic to limit the output current to the defined current threshold (as explained above) of the power supply 702. For example, if the error signal 716 equals 1V, then the error signal 718 of the differential amplifier DIFF_AMP2 is 1.5V (i.e., 2.5V−1 V) and the error signal 720 of the differential amplifier DIFF_AMP3 is 3.5V (i.e., 5V−1.5V). In such examples, the voltage reference V_VREF1 equals 3.5V. Thus, the voltage reference V_VREF1 has adjusted lower from 5V to 3.5V (e.g., a 70 percent change) in this example to limit the output current to the defined current threshold of the power supply 702. Since the voltage reference V_VREF1 has decreased by 70 percent, the output voltage Vout1 also gradually decreases by 70 percent of its initial constant voltage mode regulation. Therefore, during constant current mode, the current control loop 708 may adjust the duty cycle of the control signal 726 indirectly by adjusting the voltage reference V_VREF1.

The decrease in the voltage reference V_VREF1 (and therefore the output voltage Vout1) may continue until the output voltage Vout1 of the power supply 702 reaches a defined voltage threshold (as explained above). For example, the output voltage Vout1 may drop to about zero volts, to about half its initial constant voltage mode regulation, to a value 70 percent below its initial constant voltage mode regulation (as explained above), etc. depending on the defined voltage threshold.

When the output voltage Vout1 reaches the defined voltage threshold, the power supply 702 may again operate in its constant voltage mode at a lower regulated voltage. For example, the control circuit 706 may freeze the duty cycle of the control signal 726 when this defined voltage threshold is met, exit the constant current mode, and operate the power supply 702 in its constant voltage mode (e.g., as a fixed-duty bus converter).

At some point, the power supply 702 may transition back to its constant voltage mode based on, for example, the error signal 716 from the current-loop error amplifier I_ERROR_AMP1, the error signal 718 from the differential amplifier DIFF_AMP2, the error signal 720 from the differential amplifier DIFF_AMP3 (i.e., the voltage reference V_VREF1), etc.

Additionally, the current control loop 708 and the voltage control loop 710 are considered to operate at the same time. For example, the output of the current control loop 708 is provided to the voltage control loop 710 to control the voltage reference V_VREF1 during the constant voltage mode (where the voltage reference V_VREF1 is fixed by the output of the current control loop 708) and the constant current mode of the power supply (where the voltage reference V_VREF1 is adjusted by the output of the current control loop 708). As such, the loops 708, 710 are employed in a series as a "AND" function. This is in contrast to prior art current control loops and voltage control loops that operate as an "OR" function (i.e., either the current control loop or the voltage control loops is operating and the other is inactive).

Figure 8:
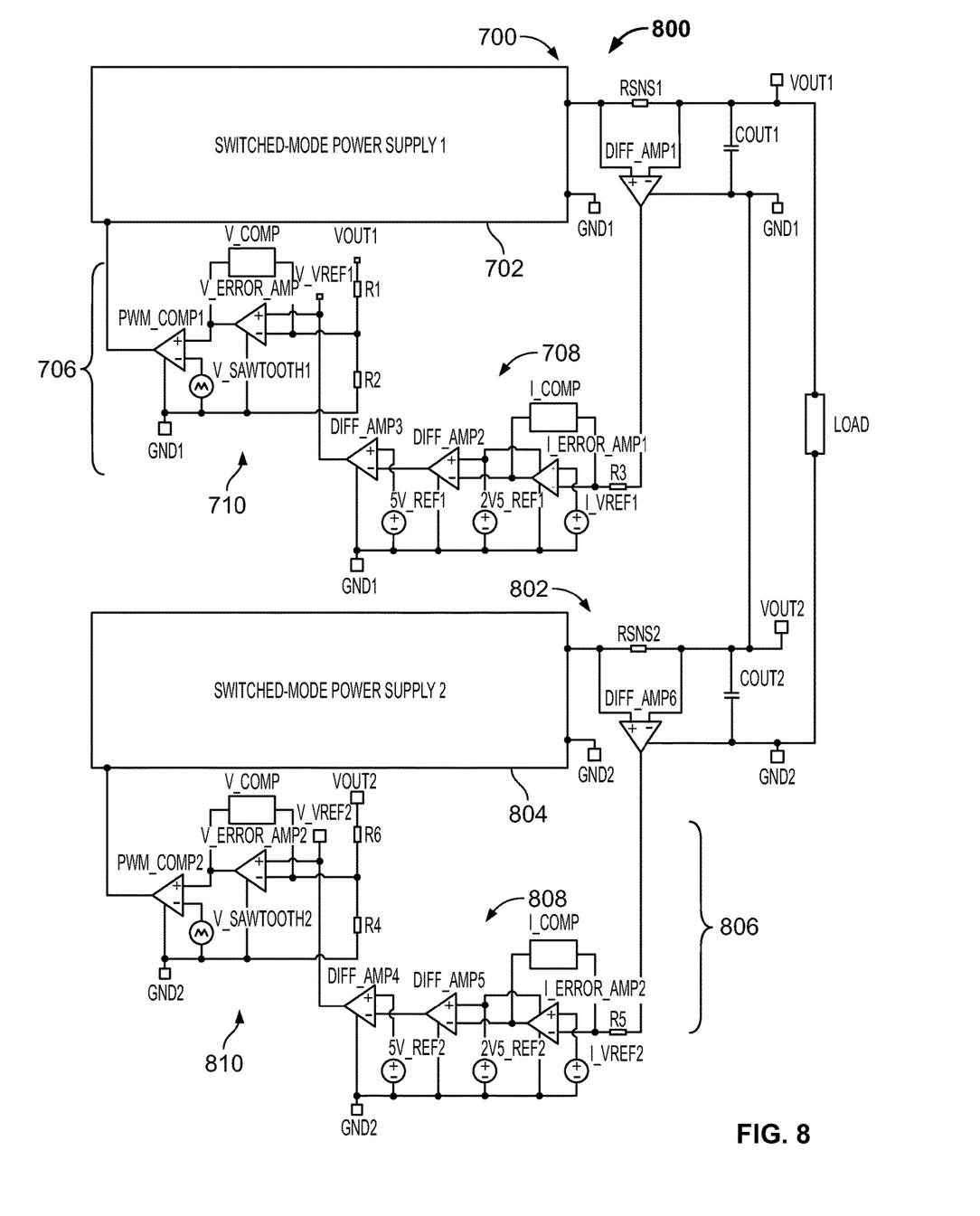
FIG. 8 is schematic of a power supply system including two switched-mode power supplies and a control circuit according to yet another example embodiment.

FIG. 8 illustrates another example power supply system 800 including the power supply unit 700 of FIG. 7 and a power supply unit 802 substantially similar to the power supply unit 700. For example, the power supply unit 802 includes a switched mode power supply 804 and a control circuit 806 having a current control loop 808 and a voltage control loop 810 for controlling the power supply 804. The control circuit 806 and the control circuit 706 may be separate control circuits or portions of one system control circuit.

The current control loop 808 and the voltage control loop 810 can be substantially similar to the current control loop 708 and the voltage control loop 710 of FIG. 7. However, the current control loop 808 and the voltage control loop 810 may include different current and/or voltage references, different resistors, compensation circuits, etc. than the current control loop 708 and the voltage control loop 710.

The switched mode power supply 804 and the switched mode power supply 702 may be substantially identical power supplies (e.g., have the same topology, similar components, component values, etc.). If the power supplies 702, 804 are identical power supplies, the current reference I_VREF1 of the current control loop 708 and a current reference I_VREF2 of the current control loop 808 may still be different. Thus, because the current references I_VREF1, I_VREF2 are used to set the defined current thresholds for each power supply 702, 804 (as explained above), these thresholds may be different from each other as well.

The difference in the current references I_VREF1, I_VREF2 may be due to component tolerances (e.g., the power supplies and/or the control circuits), parameter tolerances, etc. For example, the tolerance of the resistors RSNS1, RSNS2, the fixed voltage references (e.g., the 2.5V reference voltages, etc.), the gain of the differential amplifiers, etc. may be different.

As shown in FIG. 8, the outputs of the power supplies 702, 804 are is coupled in series. Thus, the positive output terminal (e.g., VOUT2) of the power supply 804 is coupled to the negative output terminal (e.g., GND1) of the power supply 702, and a load 812 is coupled across the positive output terminal (e.g., VOUT1) of the power supply 702 and the negative output terminal (e.g., GND2) of the power supply 804.

The power supplies 702, 804 operate as explained above. Thus, each power supply initially operates in its constant voltage mode. At some point in time, each power supply 702, 804 transitions to its constant current mode and then back to its constant voltage mode as explained above.

Figure 9:
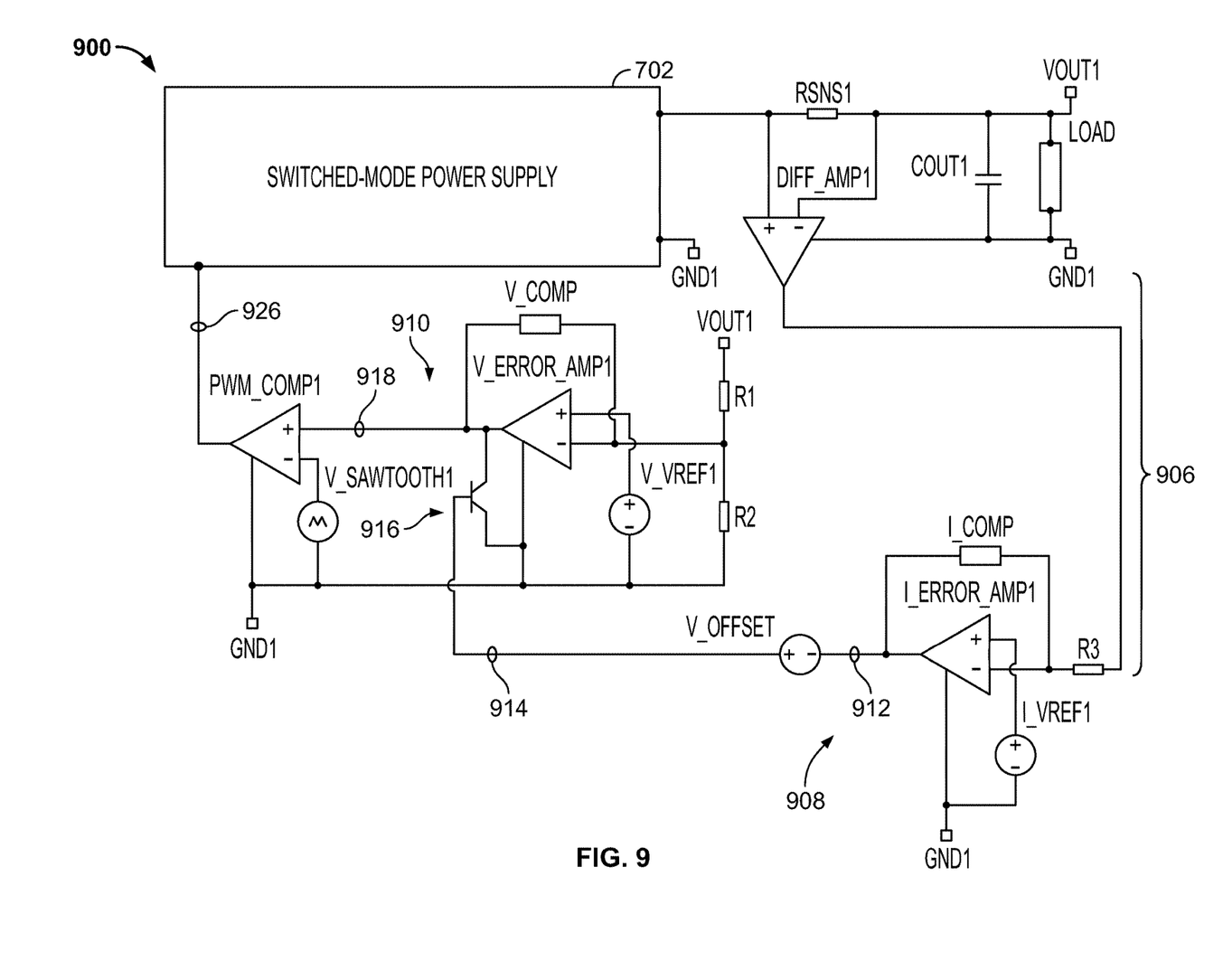
FIG. 9 is a schematic of a power supply unit including a switched-mode power supply and a control circuit having a current control loop and a voltage control loop with a fixed voltage reference according to yet another example embodiment.

FIG. 9 illustrates another example power supply and control circuit (collectively a power supply unit 900) that may be employed in one or both power supplies PS1, PS2 of FIG. 2. As shown in FIG. 9, the power supply unit 900 includes the switched mode power supply 702 of FIG. 7, and a control circuit 906 having a current control loop 908 and a voltage control loop 910 similar to the current control loop 708 and the voltage control loop 710 of FIG. 7. The voltage control loop 910, however, includes a transistor 916 coupled between an output of the voltage-loop error amplifier V_ERROR_AMP1 and ground, and a voltage reference V_VREF1 that is always fixed. That is, the voltage reference V_VREF1 is fixed when the power supply 702 is operated in its constant voltage mode and its constant current mode (as explained herein). As such, both the current control loop 908 and the voltage control loop 910 can directly control a control signal to regulate an output voltage Vout1 as further explained below.

Additionally, and different than the current control loop 708 and the voltage control loop 710 of FIG. 7, the current control loop 908 and the voltage control loop 910 of FIG. 9 do not operate at the same time. Thus, the loops 908, 910 are not implemented as a "AND" function.

As shown in FIG. 9, the voltage control loop 910 includes the voltage-loop error amplifier V_ERROR_AMP1 to compare the sensed output voltage Vout1 (via the resistors R1, R2) and the fixed voltage reference V_VREF1, and to generate an error signal 918. This error signal 918 is then provided to the control signal generator PWM_COMP1 which generates a PWM control signal 926 to control power switch(es) in the power supply 702 (as explained above).

The current-loop error amplifier I_ERROR_AMP1 of the current control loop 908 compares the output current and the current reference I_VREF1 and generates an error signal 912 (as explained above). The error signal 912 is combined with an offset voltage V_OFFSET to generate a control signal 914 for controlling the transistor 916 of the voltage control loop 910.

For example, when the control circuit 906 is controlling the power supply 702 to operate in its constant current mode (as explained above), the control signal 914 provided to a base terminal of the transistor 916 can force the transistor 916 to saturate. As a result, the transistor 916 pulls the error signal 918 downward by draining current from the output of the voltage-loop error amplifier V_ERROR_AMP1 to ground. This change in the error signal 918 can adjust a PWM duty cycle of the PWM control signal 926. In such examples, this error signal adjustment can cause the output voltage Vout1 of the power supply 702 to decrease as explained above. Thus, although the voltage reference V_VREF1 is not adjusting in the example of FIG. 9, the error signal 918 is adjustable to limit the output current to the defined current threshold of that power supply.

The amount of saturation (and therefore the amount of the error signal 918 is adjusted) is dictated by the comparison between the output current and the current reference I_VREF1, and the offset voltage V_OFFSET. In some embodiments, the offset voltage V_OFFSET sets the minimum rated operating voltage of the power supply 702 during constant current mode.

When the control circuit 906 is controlling the power supply 702 to operate in its constant voltage mode (as explained above), the control signal 914 provided to the transistor 916 does not saturate the transistor and thus does not adjust the error signal 918. The control signal generator PWM_COMP1 compares the unadjusted error signal 918 and the sawtooth signal V_SAWTOOTH1 (which represents a ramp signal in the constant voltage mode) to generate the PWM control signal 926 to regulate the output voltage Vout1 at a particular voltage (as explained above).

Figure 10:
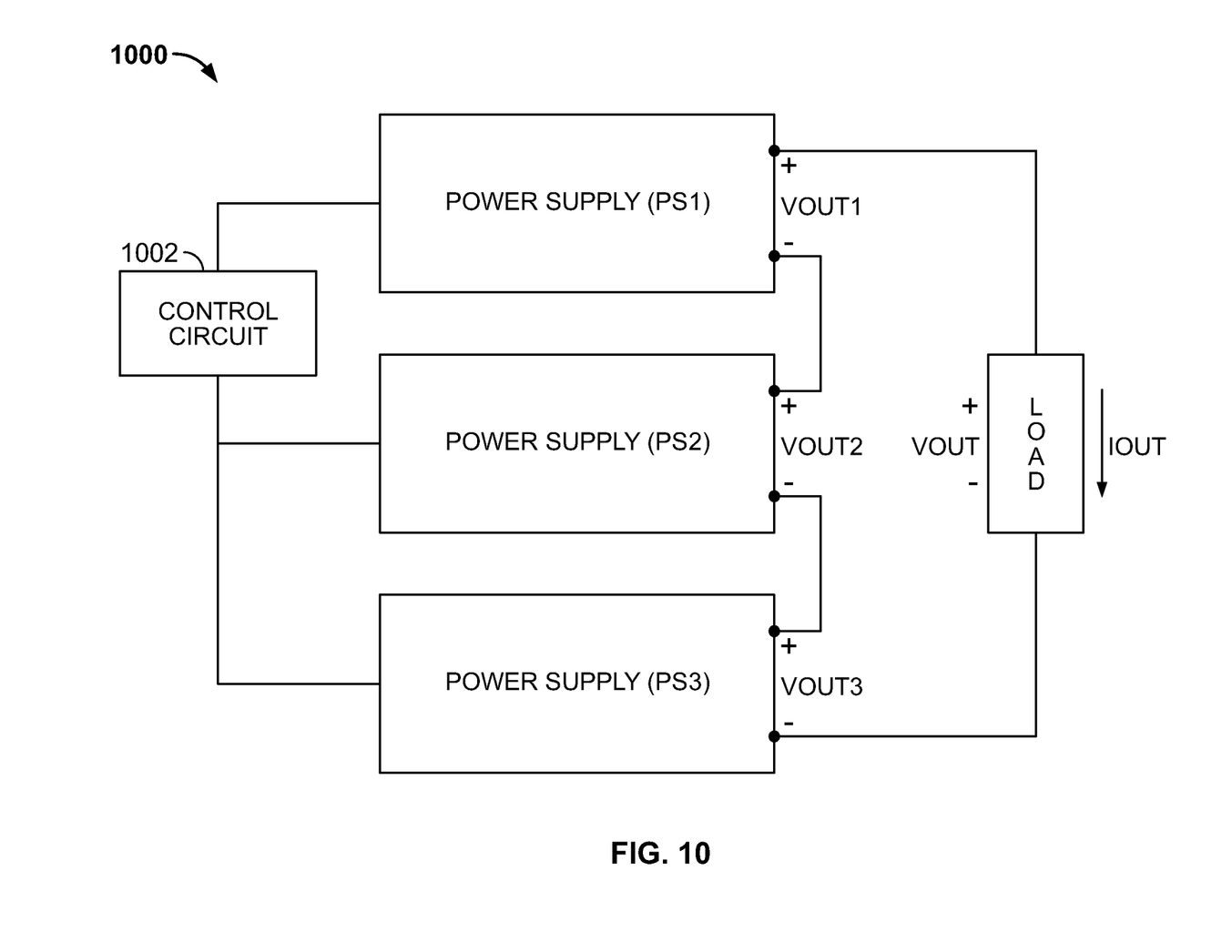
FIG. 10 is a block diagram of a power supply system including three power supplies and a control circuit according to another example embodiment.

Although the power supply systems illustrated herein include two power supplies, it should be apparent that a power supply system (including those disclosed herein) may include more than two power supplies. For example, FIG. 10 illustrates a power supply system 1000 including three power supplies PS1, PS2, PS3 and a control circuit 1002 for controlling each power supply PS1, PS2, PS3 as explained herein.

The control circuits disclosed herein may include an analog control circuit, a digital control circuit (e.g., a digital signal controller (DSC), a digital signal processor (DSP), etc.), or a hybrid control circuit (e.g., a digital control unit and an analog circuit). For example, although the control circuits 706, 806, 906 of FIGS. 7-9 employ analog control circuitry, it should be apparent to those skilled in the art that one or more portions of the control circuits may be a digital control circuit disposed on an integrated circuit (IC).

Additionally, the power supplies disclosed herein may include any suitable converter having any suitable topology without departing from the scope of the present disclosure. For example, one or more of the power supplies may include a forward converter such as a single-ended forward converter, a push-pull forward converter having a half bridge topology, a full bridge topology, etc.; a flyback converter; a non-isolated converter having a buck topology, a boost topology and/or a buck-boost topology; etc. Further, the power supplies may be an AC-DC power supply, DC-DC power supply, or a DC-AC power supply.

In addition, the power supplies may be employed in various applications including, for example, powering highly capacitive loads such as motors (e.g., synchronous motors, etc.), charging batteries such as lead-acid batteries, and/or other applications that require high initial current. For example, the power supplies may be used for charging batteries which initially requires constant current where the output voltage is low (e.g., a constant current mode operation).

By employing one or more of the features (including the different optional features) disclosed herein, users may have greater flexibility in various applications in which constant current limiting protection is desirable compared to known power supplies. Additionally, and in some examples, firmware of a digital controller may be updated to include the feature(s) disclosed herein. In some of these examples, additional components may not be needed to implement these feature(s). As such, existing control circuits may be easily configured to implement the feature(s).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A power supply system comprising:
a plurality of power supplies configured to provide an output current to a load, each power supply of the plurality of power supplies configured to operate in a constant current mode and a constant voltage mode, said each power supply including a defined current threshold, a defined voltage threshold, and an output for providing an output voltage, the outputs of the plurality of power supplies coupled in series; and
a control circuit coupled to said each power supply, the control circuit configured to:
control the plurality of power supplies to operate in their constant voltage mode allowing the output current of the plurality of power supplies to vary;
in response to the output current of the plurality of power supplies reaching the defined current threshold of one power supply of the plurality of power supplies, control said one power supply to operate in its constant current mode, while the other one or more power supplies of the plurality of power supplies remain operating in their constant voltage mode, so that the output current of the plurality of power supplies is regulated at the defined current threshold of said one power supply; and
in response to the output voltage of said one power supply reaching its defined voltage threshold, control said one power supply to operate again in its constant voltage mode so that said one power supply provides a first regulated output voltage to its output as the remaining one or more power supplies of the plurality of power supplies provide a second regulated output voltage different than the first regulated output voltage to their output(s).

2. The power supply system of claim 1 wherein the control circuit is configured to initially control said each power supply to operate in its constant voltage mode so that said each power supply provides the second regulated output voltage to its output.

3. The power supply system of claim 1 wherein the control circuit is configured to control another power supply of the plurality of power supplies to operate in its constant current mode so that the output current is regulated at the defined current threshold of said another power supply in response to the output current reaching the defined current threshold of said another power supply of the plurality of power supplies.

4. The power supply system of claim 3 wherein the defined current threshold of said another power supply is different than the defined current threshold of said one power supply.

5. The power supply system of claim 3 wherein the control circuit is configured to control said another power supply to operate again in its constant voltage mode in response to the output voltage of said another power supply reaching its defined voltage threshold.

6. The power supply system of claim 1 wherein the control circuit includes a plurality of current control loops and a plurality of voltage control loops corresponding to the plurality of power supplies and wherein each voltage control loop includes a voltage reference for regulating the output voltage of its corresponding power supply.

7. The power supply system of claim 6 wherein the current control loop and the voltage control loop corresponding to said one power supply are configured to operate at the same time.

8. The power supply system of claim 6 wherein the voltage reference of said each voltage control loop is fixed when its corresponding power supply is operated in its constant voltage mode.

9. The power supply system of claim 6 wherein the voltage reference of said each voltage control loop is fixed when its corresponding power supply is operated in its constant voltage mode and wherein the voltage reference of said each voltage control loop is adjustable when its corresponding power supply is operated in its constant current mode.

10. The power supply system of claim 9 wherein the voltage reference of said each voltage control loop is adjustable based on an output of its corresponding current control loop.

11. The power supply system of claim 9 wherein the voltage reference of said each voltage control loop is adjusted lower when its corresponding power supply is operated in its constant current mode.

12. The power supply system of claim 1 wherein the second regulated output voltage of said one power supply is greater than the first regulated output voltage.

13. The power supply system of claim 1 wherein the control circuit includes a digital controller.

14. The power supply system of claim 1 wherein said one power supply includes at least one power switch and wherein the control circuit is configured to control the at least one power switch.

15. The power supply system of claim 14 wherein the control circuit is configured to control the at least one power switch of said one power supply based on a sawtooth signal.

16. The power supply system of claim 15 wherein the sawtooth signal represents a ramp signal when said one power supply is operated in its constant voltage mode.

17. The power supply system of claim 16 wherein the sawtooth signal represents a switching current of said one power supply when said one power supply is operated in its constant current mode.

18. A control circuit for controlling a plurality of power supplies configured to provide an output current to a load, each power supply of the plurality of power supplies configured to operate in a constant current mode and a constant voltage mode, said each power supply including a defined current threshold, a defined voltage threshold, and an output for providing an output voltage, the outputs of the plurality of power supplies coupled in series, the control circuit configured to:
control the plurality of power supplies to operate in their constant voltage mode allowing the output current of the plurality of power supplies to vary;
in response to the output current of the plurality of power supplies reaching a defined current threshold of one power supply of the plurality of power supplies, control said one power supply to operate in its constant current mode, while the other one or more power supplies of the plurality of power supplies remain operating in their constant voltage mode, so that the output current of the plurality of power supplies is regulated at the defined current threshold of said one power supply; and
in response to the output voltage of said one power supply reaching its defined voltage threshold, control said one power supply to operate again in its constant voltage mode so that said one power supply provides a first regulated output voltage to its output as the remaining one or more power supplies of the plurality of power supplies provide a second regulated output voltage different than the first regulated output voltage to their output(s).

19. The control circuit of claim 18 wherein the control circuit is configured to control another power supply of the plurality of power supplies to operate in its constant current mode so that the output current is regulated at the defined current threshold of said another power supply in response to the output current reaching the defined current threshold of said another power supply of the plurality of power supplies.

20. The control circuit of claim 19 wherein the control circuit is configured to control said another power supply to operate again in its constant voltage mode in response to the output voltage of said another power supply reaching its defined voltage threshold.

21. A power supply system comprising:
a plurality of power supplies configured to provide an output current to a load, each power supply of the plurality of power supplies configured to operate in a constant current mode and a constant voltage mode, said each power supply including a defined current threshold and an output for providing an output voltage, the outputs of the plurality of power supplies coupled in series; and
a control circuit coupled to said each power supply, the control circuit configured to in response to the output current of the plurality of power supplies reaching a defined current threshold of one power supply of the plurality of power supplies, control said one power supply to operate in its constant current mode, while the other one or more power supplies of the plurality of power supplies operate in their constant voltage mode, so that the output current of the plurality of power supplies is regulated at the defined current threshold of said one power supply.

22. The power supply system of claim 21 wherein the control circuit is configured to initially control said each power supply to operate in its constant voltage mode so that said each power supply provides the second regulated output voltage to its output.

23. The power supply system of claim 21 wherein the control circuit is configured to control another power supply of the plurality of power supplies to operate in its constant current mode so that the output current is regulated at the defined current threshold of said another power supply in response to the output current reaching the defined current threshold of said another power supply of the plurality of power supplies.

24. The power supply system of claim 21 wherein the control circuit includes a plurality of current control loops and a plurality of voltage control loops corresponding to the plurality of power supplies and wherein each voltage control loop includes a voltage reference for regulating the output voltage of its corresponding power supply.

25. The power supply system of claim 24 wherein the current control loop and the voltage control loop corresponding to said one power supply are configured to operate at the same time.

26. The power supply system of claim 25 wherein the voltage reference of said each voltage control loop is fixed when its corresponding power supply is operated in its constant voltage mode, and wherein the voltage reference of said each voltage control loop is adjustable when its corresponding power supply is operated in its constant current mode.

27. The power supply system of claim 21 wherein said one power supply includes at least one power switch, and wherein the control circuit is configured to control the at least one power switch based on a sawtooth signal.

* * * * *